United States Patent
Dmytriw

(10) Patent No.: US 7,280,927 B1
(45) Date of Patent: *Oct. 9, 2007

(54) METHOD AND SYSTEM FOR PROVIDING A LINEAR SIGNAL FROM A MASS AIRFLOW AND/OR LIQUID FLOW TRANSDUCER

(75) Inventor: Anthony M. Dmytriw, Dublin, OH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/545,828

(22) Filed: Oct. 11, 2006

(51) Int. Cl.
*G06F 1/00* (2006.01)
(52) U.S. Cl. .............................. 702/45; 73/1.34; 73/861
(58) Field of Classification Search .................. 702/45, 702/47, 50, 55, 127; 73/861, 204.26, 1.34, 73/202.5; 62/129, 225
See application file for complete search history.

(56) References Cited

U.S. PATENT DOCUMENTS

| | | | |
|---|---|---|---|
| 4,341,107 A * | 7/1982 | Blair et al. .................. 73/1.34 |
| 5,892,145 A | 4/1999 | Moon et al. ............... 73/118.2 |
| 6,684,695 B1 | 2/2004 | Fralick et al. ............ 73/204.26 |
| 6,805,003 B2 | 10/2004 | Ueki et al. ............... 73/204.26 |
| 6,820,481 B1 | 11/2004 | Weber et al. ............. 73/204.26 |
| 6,912,918 B1 | 7/2005 | Lynnworth et al. ....... 73/861.26 |
| 7,073,392 B2 * | 7/2006 | Lull et al. ...................... 73/861 |
| 2004/0026365 A1 | 2/2004 | Fuertsch et al. .............. 216/39 |
| 2005/0189343 A1 | 9/2005 | Griffin et al. ................ 219/494 |
| 2006/0048568 A1 | 3/2006 | Komiyenko et al. ...... 73/204.22 |
| 2006/0059986 A1 | 3/2006 | Wildgen ..................... 73/202.5 |

FOREIGN PATENT DOCUMENTS

EP 574288 A * 12/1993

OTHER PUBLICATIONS

Error handling process for digital audio signal transmission system—using Fourier transform to enable prediction of data, and concealment of signal errors, Abstarct, Mahieux, EP 574288 A, Dec. 15, 1993.*
U.S. Appl. No. 11/436,807.*

* cited by examiner

*Primary Examiner*—John Barlow
*Assistant Examiner*—John Le
(74) *Attorney, Agent, or Firm*—Kermit D. Lopez; Luis M. Ortiz

(57) ABSTRACT

A method and system for providing a linear signal from a flow transducer. A non-linear raw signal can be obtained from a mass flow transducer. An approximated error comprising a discrete sinusoidal function incremented by a variable and selectable omega value can then be subtracted from the non-linear raw signal, in order to provide a subtracted result and reduce an error range thereof. The linear signal can then be obtained from the subtracted result in order to linearize a raw output from the flow transducer. A user is thus permitted to tune a frequency increment associated with the variable and selectable omega value in order to reduce the error range thereof. Linearized airflow and liquid flow sensor outputs can thus be generated by allowing a user the freedom to tune the frequency increment depending upon the user's flow range for reducing errors.

13 Claims, 9 Drawing Sheets $$Linear\ Flow = RawFlow - [A*\sin(\omega*\pi*RawFlow) + B*\sin(2*\omega*\pi*RawFlow) + C*\sin(3*\omega*\pi*RawFlow)\ldots N*\sin(n*\omega*\pi*RawFlow)]$$

$$Linear\ Flow = RawFlow - [A*\sin(\omega*\pi*RawFlow) + B*\sin(2*\omega*\pi*RawFlow) + C*\sin(3*\omega*\pi*RawFlow)\ldots N*\sin(n*\omega*\pi*RawFlow)]$$

METHOD AND SYSTEM FOR PROVIDING A LINEAR SIGNAL FROM A MASS AIRFLOW AND/OR LIQUID FLOW TRANSDUCER

TECHNICAL FIELD

Embodiments are generally related to flow sensors. Embodiments are also related to mass airflow transducers and liquid flow transducers. Embodiments are additionally related to techniques and devices for providing a linear signal from mass airflow transducers and/or liquid flow transducers.

BACKGROUND OF THE INVENTION

Mass Flow transducers are used in a variety of industries to quantify the flow rate of a substance. Various types of mass flow transducers are known. For example, mass airflow transducers and liquid flow transducers are utilized in many commercial, consumer and medical applications. The medical industry, for example, uses mass flow transducers to monitor and control the breathing of a patient. One common technique for sensing mass flow involves utilizing multiple resistive temperature detectors on each side of a heating element parallel to the direction of flow. As a mass such as a fluid or gas flows across the resistors, resistors that are located upstream from the heating element are cooled, and resistors located downstream from the heating element are heated. When a voltage is applied across these resistors, an electrical signal is generated. The signal generated using multiple resistive temperature detectors are highly non-linear and not ideal for use in most "high accuracy" control systems.

Two types of methods are currently utilized to approximate a non-linear mass flow signal into a linear output: piece-wise linear functions or polynomial approximation. In piece-wise linear functions, the linear signal is approximated by many linear equations distributed throughout the range of the signal. In polynomial approximation, a polynomial expression is used to describe the signal. Another method has been implemented for linearizing a mass flow signal by subtracting discrete sinusoidal functions incremented by omega, a frequency increment, that describe the original error (or non-linearity) of the signal.

A need exists for improved accuracy in the generation of linear signal with less coefficients and mathematical steps as a part of mass flow transducer. It is believed that a solution to this problem involves the implementation of an improved method and system for linearizing the raw output of a mass airflow and/or liquid flow transducer as described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved flow sensor method and system.

It is another aspect of the present invention to provide for a method and system for generating a linear signal from a mass airflow transducer and/or a liquid flow transducer.

It is another aspect of the present invention to provide a method and system for linearizing a raw output signal from a mass flow transducer.

It is a further aspect of the present invention to provide for a method and system for providing a linear signal from a mass air flow and liquid flow transducer.

The aforementioned aspects and other objectives and advantages can now be achieved as described herein. A method and system for providing a linear signal from a flow transducer is disclosed. A non-linear raw signal can be obtained from a mass flow transducer. An approximated error comprising a discrete sinusoidal function incremented by a variable and selectable omega value can then be subtracted from the non-linear raw signal, in order to provide a subtracted result and reduce an error range thereof. The linear signal can then be obtained from the subtracted result in order to linearize a raw output from the flow transducer. A user is thus permitted to tune a frequency increment associated with the variable and selectable omega value in order to reduce the error range thereof. Linearized airflow and liquid flow sensor outputs can thus be generated by allowing a user the freedom to tune the frequency increment depending upon the user's flow range for reducing errors.

In general, a system for providing a linear signal from a flow transducer can be implemented, which includes a data-processing apparatus, a module executed by the data-processing apparatus, the module and the data-processing apparatus being operable in combination with one another to obtain a non-linear raw signal from a flow transducer; approximate a non-linear error from the non-linear raw signal; subtract from the non-linear raw signal, an approximated error comprising a discrete sinusoidal function incremented by a variable and selectable value, in order to provide a subtracted result and reduce an error range thereof; and obtain a linear signal from the subtracted result in order to linearize a raw output from the flow transducer.

The variable and selectable value generally comprises an omega variable. The data-processing apparatus and the module are also operable in combination with one another to permit a user to tune a frequency increment associated with the variable and selectable value in order to reduce the error range thereof. The data-processing apparatus can be provided as an Application Specific Integrated Circuit (ASIC) that is associated with the mass flow transducer and/or in the context of a computer, including components such as a memory, processor, etc. The data-processing apparatus or ASIC can be configured to include a memory for storing a plurality of memory storing coefficients, an amplifier, and an approximation mechanism for performing an approximation calculation, wherein the approximation receives the plurality of memory storing coefficients from the memory and an output signal from the amplifier and wherein the approximation mechanism approximates the non-linear error from the non-linear raw signal. Such an ASIC can also be configured to include a circuit for generating the discrete sine function, wherein the circuit provides the discrete sine function to the approximation mechanism, and a subtractor that receives an output signal from the amplifier and an output signal from the approximation mechanism, wherein the subtractor subtracts the approximated error from the non-linear signal to produce the subtracted result.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
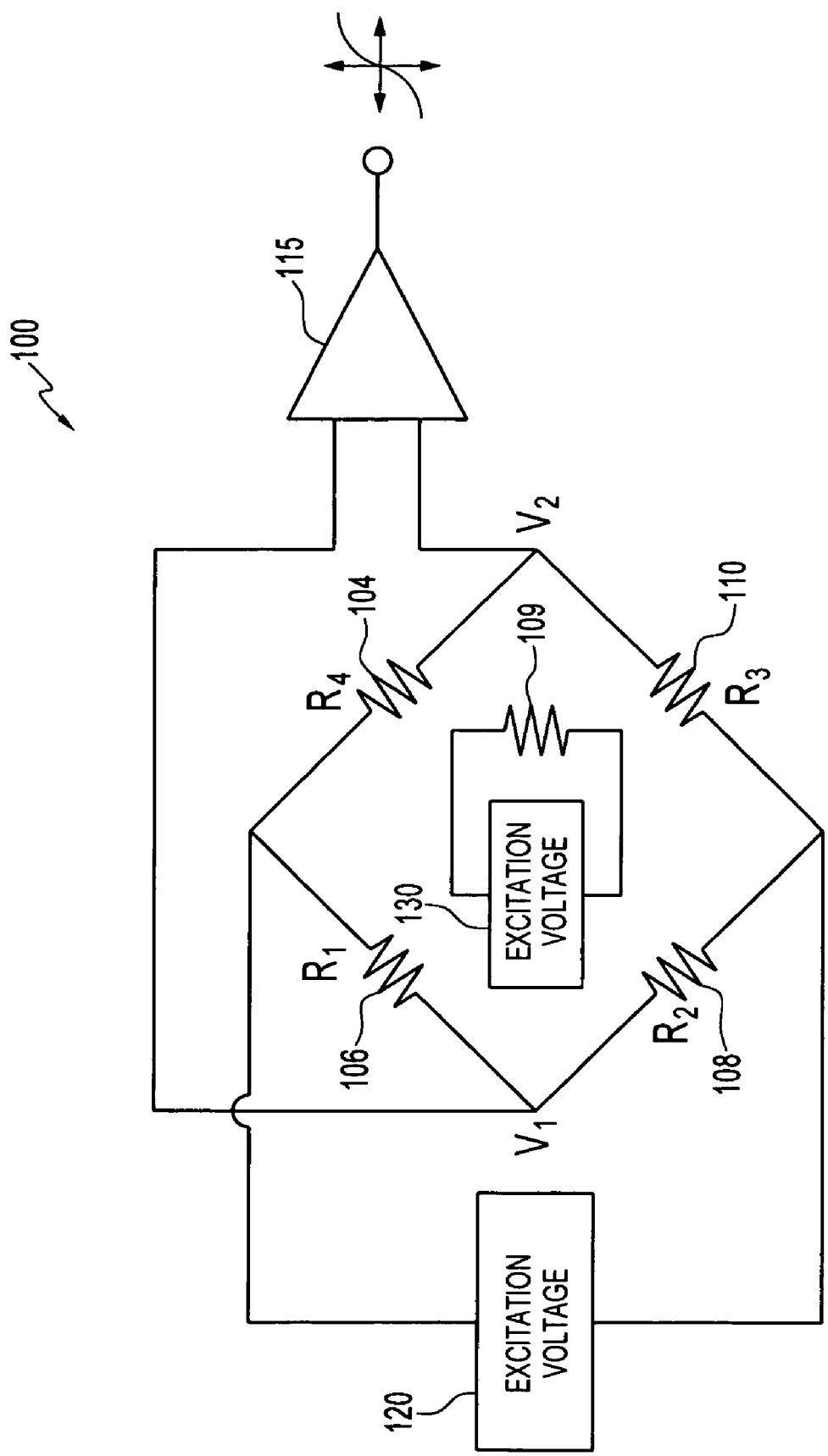
FIG. 1 illustrates a schematic diagram of a Temperature Sensing Wheatstone bridge circuit that can be adapted for use with a mass airflow transducer and/or a liquid flow transducer, in accordance with a preferred embodiment.

FIG. 1 illustrates a schematic diagram of bridge circuit 100 or system that can be adapted for use with a mass airflow transducer and/or a liquid flow transducer, and implemented in accordance with a preferred embodiment. The system of circuit 100 generally includes a group of resistors 104, 106, 108, 110, which are connected to an excitation voltage 120 and an amplifier 115. The resistors 104, 106, 108, 110 are arranged as a Wheatstone bridge circuit and are connected to the amplifier 115 at nodes $V_1$ and $V_2$. The circuit 100 can be implemented in the context of an ASIC (Application Specific Integrated Circuit).

As mass flows across the group of resistors 104, 106, 108, 110, the resistors 106 and 110 upstream from a resistor 109 (i.e., a heater) are cooled and the resistors 104 and 108 downstream from the heater or resistor 109 are heated. Note that the resistor 109 is connected to an excitation voltage 130. An electrical signal can be generated when the excitation voltage 120 is applied across the group of resistors 104, 106, 108, 110. A temperature difference is produced by the fluid stream passing over the heater 109 and then over the resistors 104 and 108. This temperature difference, unbalances the bridge causing a voltage difference that is amplified using the amplifier 115 and then calibrated to the mass flow rate. The signal obtained from the amplifier 115 generally constitutes a non-linear raw signal with respect to fluid flow.

Figure 2:
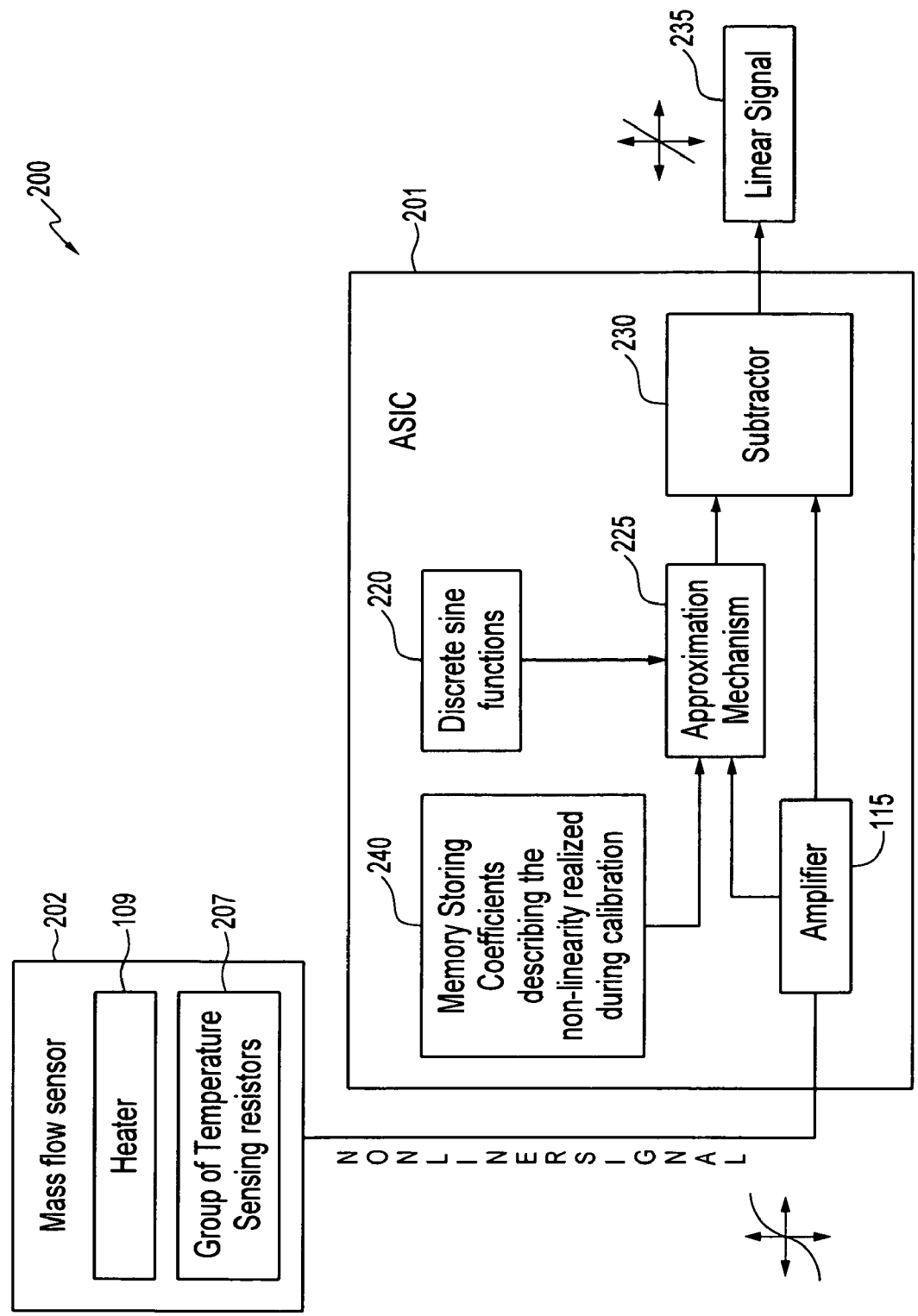
FIG. 2 illustrates a schematic diagram of a process for linearizing a non-linear, raw, mass flow signal, in accordance with a preferred embodiment.

FIG. 2 illustrates a schematic diagram of a system 200 of linearizing the non-linear raw signal obtained from the amplifier 115, in accordance with a preferred embodiment. Note that in FIGS. 1-2, identical or similar parts or elements are generally indicated by identical reference numerals. For example, resistors 104, 106, 108, 110 depicted in FIG. 1, generally represent the group of resistors 207 depicted in FIG. 2. The amplifier 115 and heater 109 of the bridge circuit 100 are also depicted in FIG. 2 and can be adapted for use with a mass flow transducer 202, which is electrically connected to an ASIC 201. The ASIC 201 generally includes an amplifier 115, which provides an electrical signal to an approximation mechanism 225. ASIC 201 also includes a memory 240, which can store coefficients describing an error realized during calibration. Memory 240 and amplifier 115 are electrically connected to an approximation mechanism 225.

The output signal from the circuit 100 can be provided to the amplifier 115 and is subject to amplification by amplifier 115. The output signals from a memory storing coefficients describing an error realized during calibration are stored in memory 240. The data stored in memory 240 and an amplified non-linear signal from amplifier 115 can be provided as input signals to approximation mechanism 225. Such an approximation method approximates an error from the original non-linear raw signal utilizing a circuit 220 for generating a discrete sine function. A subtractor 230 can then be utilized to subtract the approximated error from the original non-linear raw signal, in order to obtain a linear signal 235. Thus, the embodiments described herein can be implemented using ASIC 201 (Application Specific Integrated Circuit) mated with a raw mass flow transducer 202.

Figure 3:
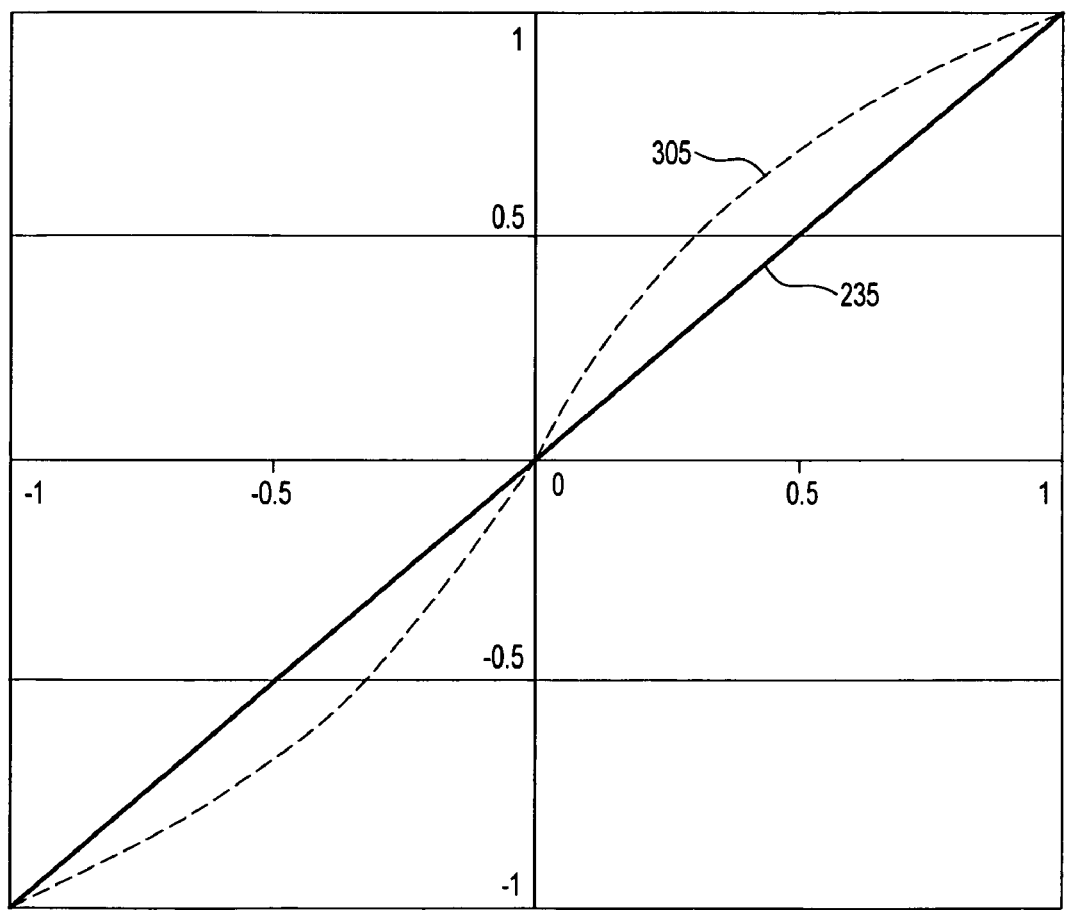
FIG. 3 illustrates a graph depicting the voltage signal verses airflow of the non-compensated and compensated (desired) signals, in accordance with a preferred embodiment.

FIG. 3 illustrates a graph 300 depicting the variation of voltage verses fluid flow for a non-linear, non-compensated, signal 305 and a linear desired signal 235 in accordance with a preferred embodiment. As indicated in graph 300, a non-linear raw signal 305 obtained from a mass flow transducer 202 is converted into a linear signal 235 as a result of the operations depicted in FIG. 2 and in association with the circuit 100 depicted in FIG. 1. The method for linearizing the signal will be contained in the ASIC 201.

Figure 4:
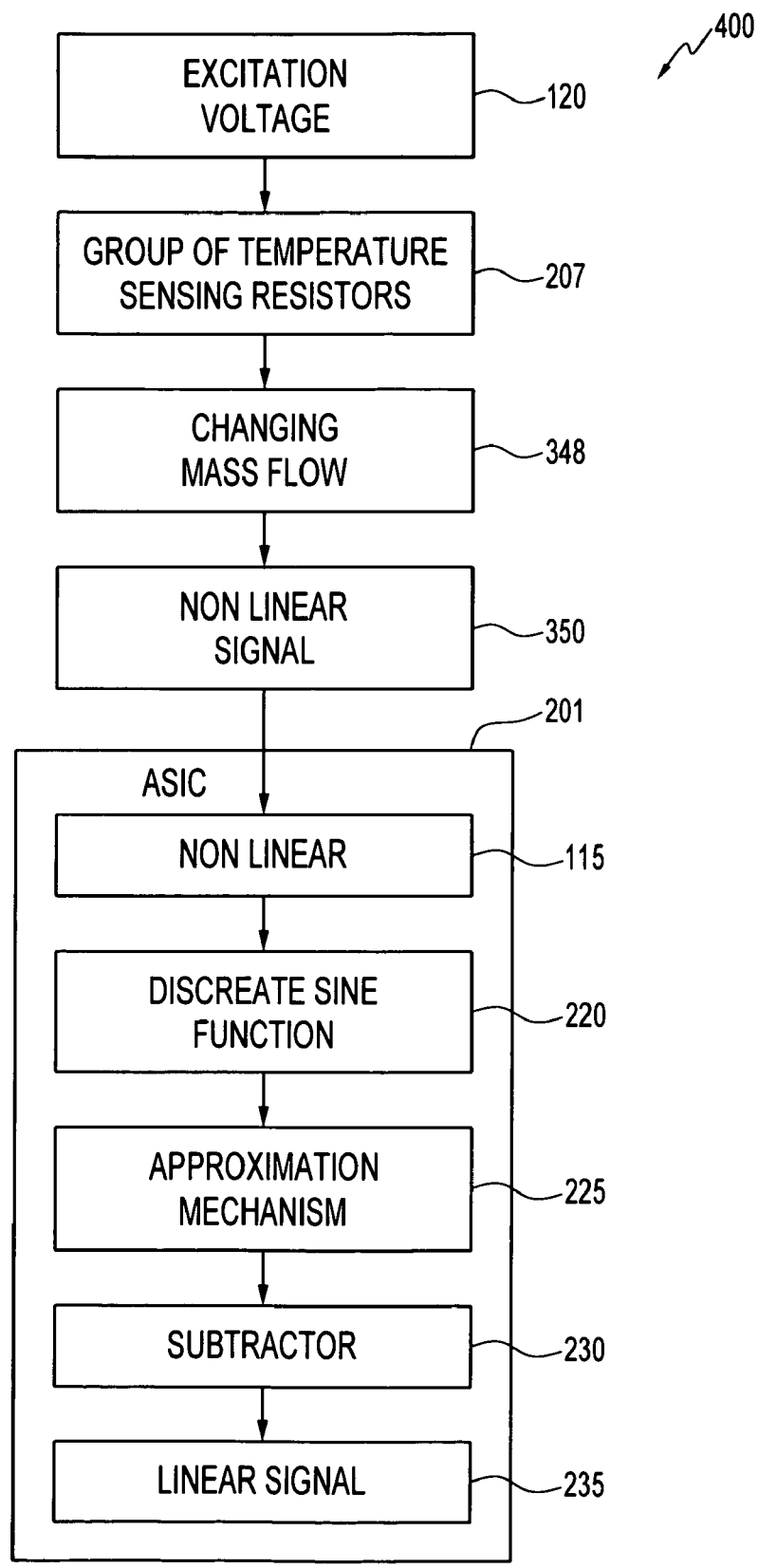
FIG. 4 illustrates a block diagram showing a process of linearizing a non-linear signal using an ASIC, in accordance with a preferred embodiment.

FIG. 4 illustrates a block diagram 400 showing a process of linearizing a non-linear signal using an ASIC 201, in accordance with a preferred embodiment. Note that in FIGS. 1-3, identical or similar parts or elements are generally indicated by identical reference numerals. The FIG. 4 illustrates a group of resistors 207, an excitation voltage 120, a functionality 348 for changing mass flow, an amplifier 115, a non linear signal 350, an ASIC 201, a circuit 220 for generating discrete sine functions, a subtractor 230, an approximation mechanism 225 and a linear signal 235 as depicted previously with respect to in FIG. 2 and FIG. 3. Note that the functionality 348 for changing mass flow is utilized for creating the non-linear signal.

Figure 5:
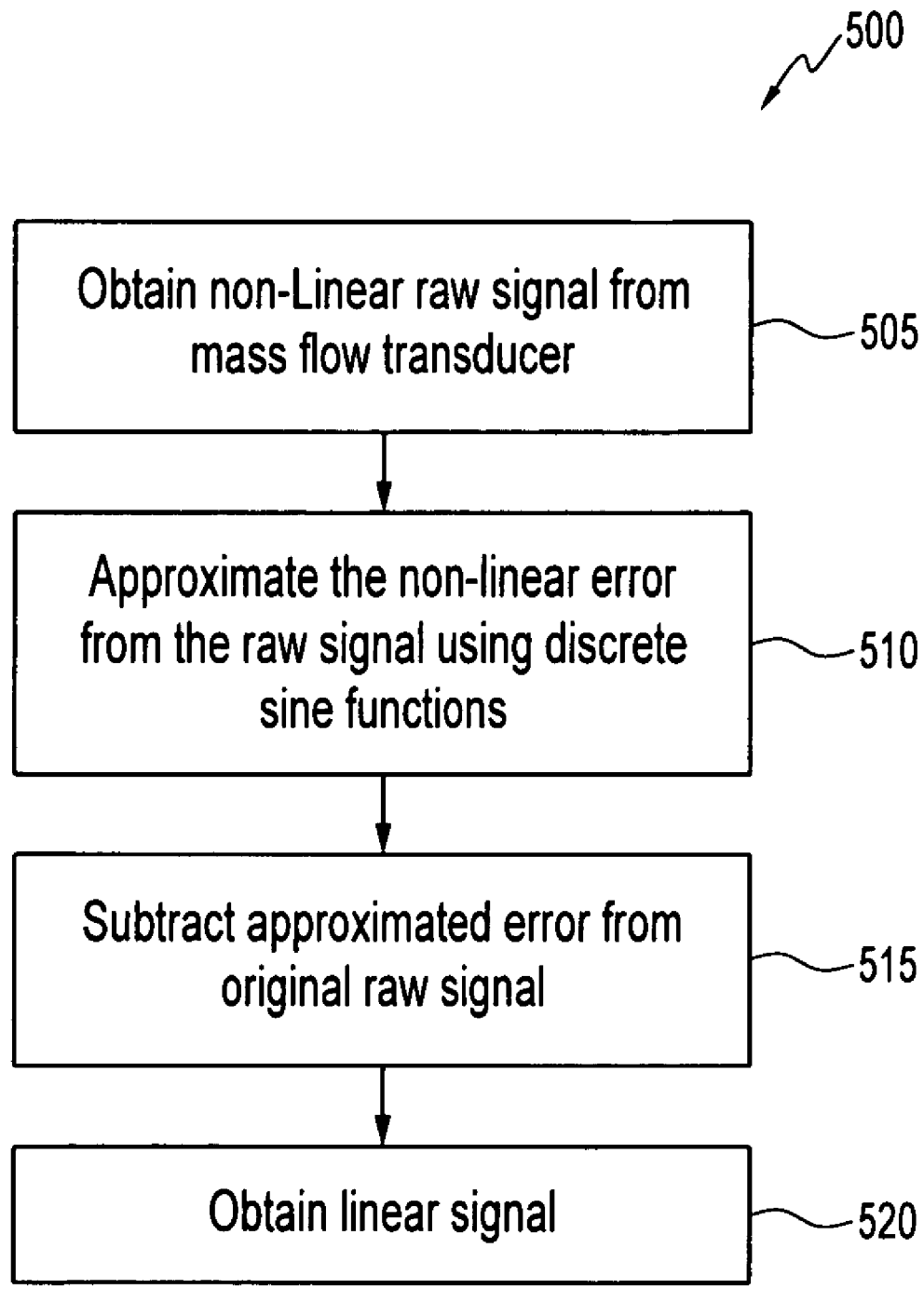
FIG. 5 illustrates a high level flow chart of operations depicting a linearization method for a mass flow transducers, in accordance with a preferred embodiment.

FIG. 5 illustrates a high level flow chart of operations depicting a linearization method 500 for a mass flow transducer 202, in accordance with a preferred embodiment. As indicated at block 505, a linear signal can be obtained from the mass flow transducer 202 depicted in FIG. 2. Thereafter, as described at block 510, a non-linear error obtained from the raw output signal generated by circuit 100 depicted in FIG. 1 can be approximated using a discrete sine function generated by the circuit 220 depicted in FIG. 2. Thereafter, as depicted at block 520, a linear signal can be obtained by subtracting (e.g., using the subtractor 230 depicted in FIG. 2) the approximated error from the original raw signal as depicted previously at block 515.

Figure 6:
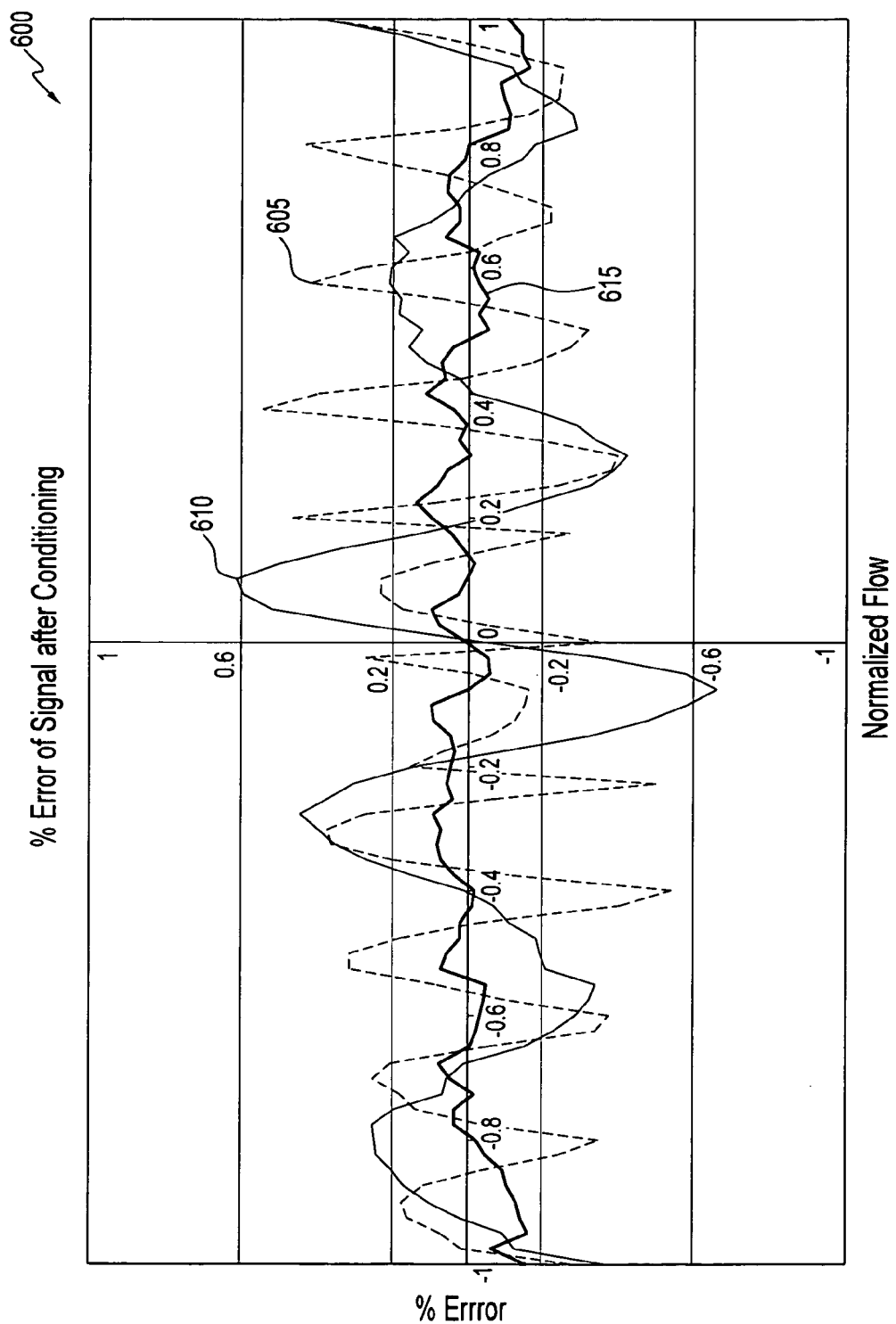
FIG. 6 illustrates a graph depicting a percentage error verses normalized flow for the linearized output of a mass flow transducer, in accordance with a preferred embodiment.

FIG. 6 illustrates a graph 600 depicting a percentage error verses normalized flow for the linearized output of a mass flow sensor, in accordance with a preferred embodiment. As indicated in graph 600, an optimized $7^{th}$ order polynomial approximation 610 and a 10 segment piece-wise linear approximation 605 can be compared with the Error Plot of subtracting 7 optimized sinusoidal curves 615 used to approximate the original error from the raw signal. Note that instead of approximating the mass flow signal, however, one can approximate the ERROR from the original raw signal using discrete sine functions and subtract the ERROR from the original raw signal to linearize it. This method allows for improved accuracy in the linear signal with less coefficients and mathematical steps. This method for linearizing the raw output of a mass flow transducer is superior to present Industry methods due to the reduction of Error (increase in accuracy) for less coefficients (less mathematical calculations providing a decrease in overall sensor response time) used to describe the signal. Such a method is based on the ability to manipulate the frequency increment of the Sinusoidal Expressions describing the Original Sensor's Error.

Figures 7A, 7B:
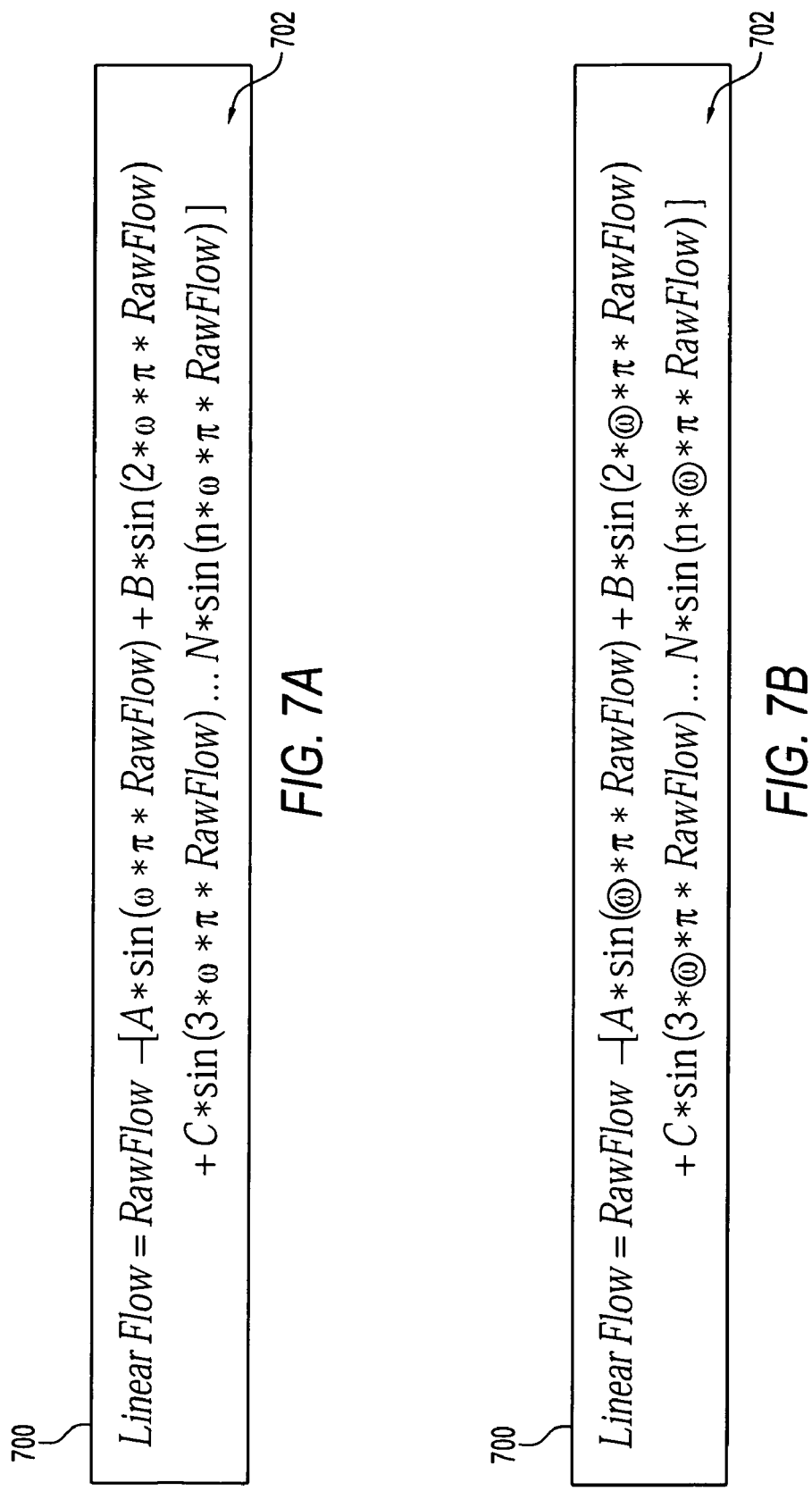
FIGS. 7(a) and 7(b) illustrate an example equation, which can be implemented in accordance with a preferred embodiment.

FIGS. 7(a) and 7(b) illustrate an example equation 702 as indicated at block 700, which can be implemented in accordance with a preferred embodiment. FIGS. 7(a) and 7(b) illustrate the same equation 702. The illustration presented in FIG. 7(b) is provided, however to demonstrate the fact that the Omega, w, the Frequency increment is preferably a variable inside the digital ASIC 100 that can be tuned for best results to describe the original error of the signal within the range required by a particular user.

In the cases where a customer desires to use an airflow (or liquid flow) sensor in a flow range smaller than the mechanical flow range of the sensor, the frequency increment can be "tuned" to the specific range that the user will use for the sensor. For example, a user may desire to utilize a +/−200 sccm (meaning 200 sccm, standard cubic centimeters per minute, in each direction) airflow sensor in a range of −200 sccm to 100 sccm. In this case, by providing the user with the freedom to change the frequency increment, the user can "tune" the sensor "digitally" to that specific range instead of using the +/−200 sccm range. For example, refer to the projected Error Plots 800 and 900 respectively depicted in FIGS. 8 and 9 using SAME raw-transducer signal data with different frequency increments.

Figure 8:
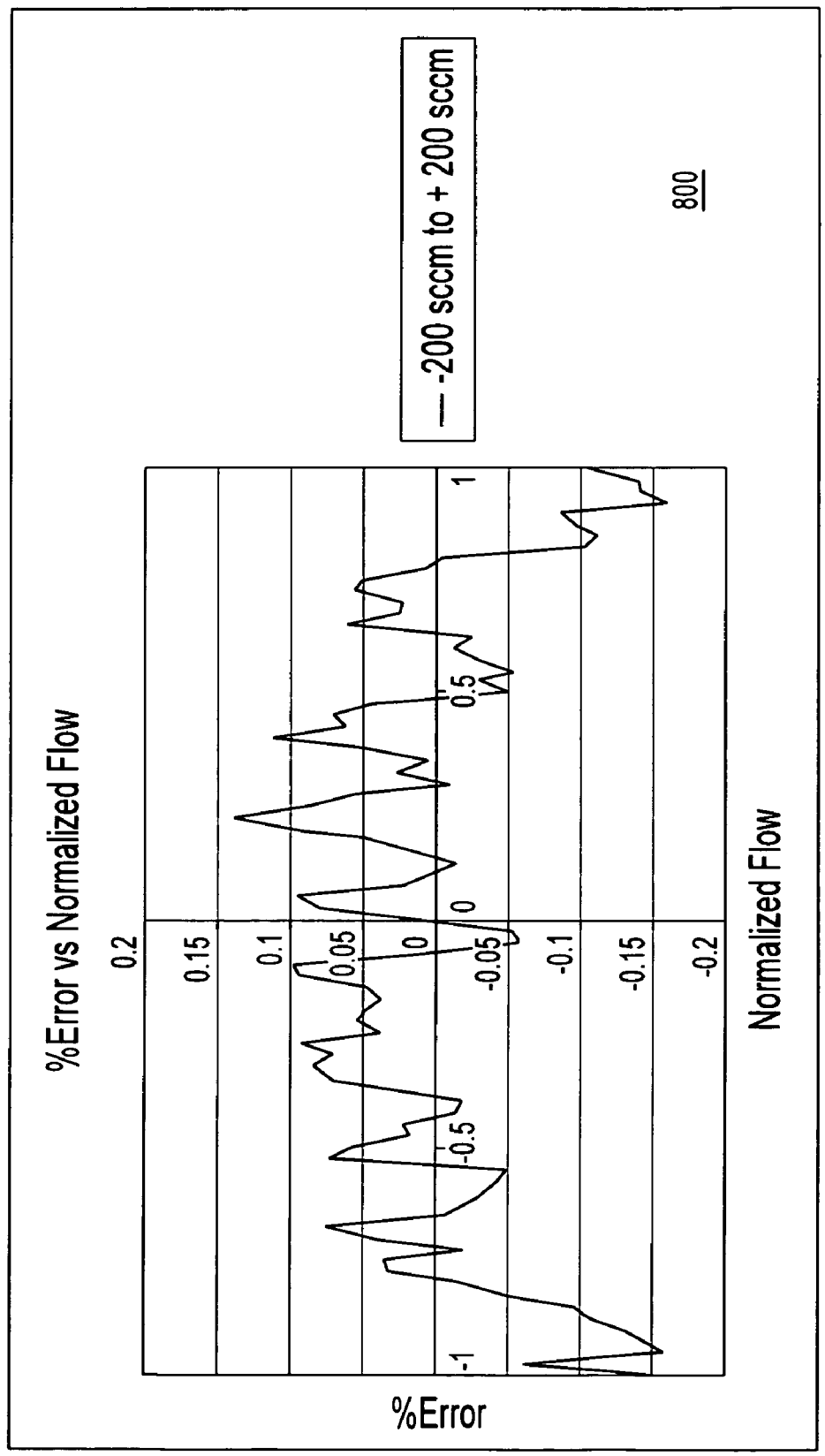
FIG. 8 illustrates a graph depicting a percentage error verses normalized flow for the linearized output of a mass airflow sensor or liquid flow sensor, in accordance with a preferred embodiment.
Figure 9:
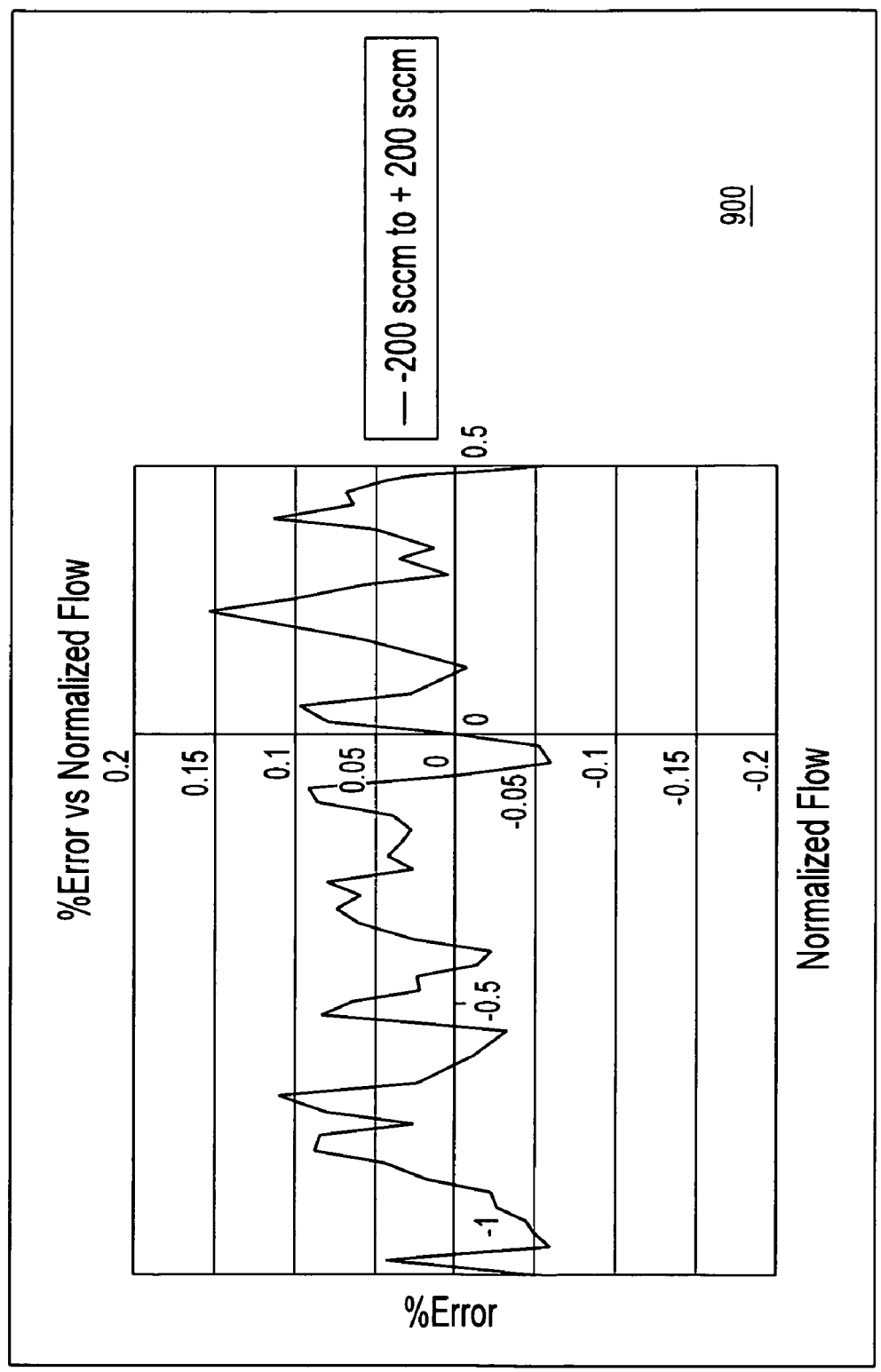
FIG. 9 illustrates a graph depicting a percentage error verses normalized flow for the linearized output of a mass airflow sensor or liquid flow sensor, in accordance with a preferred embodiment.

FIG. 8 illustrates a graph 800 depicting a percentage error verses normalized flow for the linearized output of a mass airflow sensor or liquid flow sensor, in accordance with a preferred embodiment. FIG. 9 illustrates a graph 900 depicting a percentage error verses normalized flow for the linearized output of a mass airflow sensor or liquid flow sensor, in accordance with a preferred embodiment. Graph 800 is generally plotted in a range of −200 sccm to +200 sccm. Graph 900, on the other hand, is generally plotted in a range of −200 sccm to +100 sccm. FIG. 9 indicates that the Frequency increment can be "tuned" for the specific customer range within the full mechanical range. Thus, it can be appreciated that Omega, w, is not a constant as in the prior art, but is implemented as a tunable variable in order to digitally tweak the process depending on the mass air flow and/or liquid flow range.

Note that the embodiments disclosed herein can be implemented in the context of a host operating system and one or more module(s). In the computer programming arts, a software module can be typically implemented as a collection of routines and/or data structures that perform particular tasks or implement a particular abstract data type. Software modules generally comprise instruction media storable within a memory location of a data-processing apparatus and are typically composed of two parts. First, a software module may list the constants, data types, variables, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules or instruction media can be utilized separately or together to form a program product that can be implemented through signal-bearing media, including transmission media and recordable media. Such a module or modules can be utilized, for example, to carry out the methodology depicted in FIG. 5.

A data-processing apparatus can be provided via the ASIC 201 described herein to perform a particular task or series of tasks or via another data-processing apparatus, such as a computer. Alternatively, ASIC 201 may function in association with a computer to provide the functionalities described herein. Although such a data-processing apparatus can be implemented in the context of a fully functional data-processing apparatus, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

Any type of computer-readable media that can store data that is accessible by a computer, such as magnetic cassettes, flash memory cards, digital versatile discs (DVDs), Bernoulli cartridges, random access memories (RAMs), and read only memories (ROMs) can be used in connection with the embodiments.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for providing a linear signal from a flow transducer, comprising:

obtaining a non-linear raw signal from a flow transducer;

approximating a non-linear error from said non-linear raw signal;

subtracting from said non-linear raw signal, an approximated error comprising discrete sine functions incremented by a variable and selectable value, in order to provide a subtracted result and reduce an error range thereof;

obtaining a linear signal from said subtracted result in order to linearize a raw output from said flow transducer; and permitting a user to tune a frequency increment associated with said variable and selectable value in order to reduce said error range thereof;

associating said mass flow transducer with an Application Specific Integrated Circuit (ASIC), wherein said ASIC comprises:

an amplifier and a memory for storing a plurality of memory storing coefficients;

an approximation mechanism for performing an approximation calculation, wherein said approximation receives said plurality of memory storing coefficients from said memory and an output signal from said amplifier and wherein said approximation mechanism approximates said non-linear error from said non-linear raw signal;

a circuit for generating said discrete sine functions, wherein said circuit provides said discrete sine function to said approximation mechanism; and a subtractor that receives an output signal from said amplifier and an output signal from said approximation mechanism, wherein said subtractor subtracts said approximated error from said non-linear signal to produce said subtracted result.

2. The method of claim 1 wherein said variable and selectable value comprises an omega variable.

3. The method of claim 1 further comprising permitting a user to tune a frequency increment associated with said variable and selectable value in order to reduce said error range thereof.

4. The method of claim 1 wherein said flow transducer comprises a mass airflow transducer.

5. The method of claim 1 wherein said flow transducer comprises a liquid flow transducer.

6. A method for providing a linear signal from a flow transducer, comprising:

obtaining a non-linear raw signal from a flow transducer;

approximating a non-linear error from said non-linear raw signal;

subtracting from said non-linear raw signal, an approximated error comprising a discrete sine functions incremented by a variable and selectable value, in order to provide a subtracted result and reduce an error range thereof, wherein said variable and selectable value comprises an omega variable;

obtaining a linear signal from said subtracted result in order to linearize a raw output from said flow transducer; and permitting a user to tune a frequency increment associated with said variable and selectable value in order to reduce said error range thereof;

associating said mass flow transducer with an Application Specific Integrated Circuit (ASIC), wherein said ASIC comprises:

an amplifier and a memory for storing a plurality of memory storing coefficients;

an approximation mechanism for performing an approximation calculation, wherein said approximation receives said plurality of memory storing coefficients from said memory and an output signal from said amplifier and wherein said approximation mechanism approximates said non-linear error from said non-linear raw signal;

a circuit for generating said discrete sine function, wherein said circuit provides said discrete sine function to said approximation mechanism; and a subtractor that receives an output signal from said amplifier and an output signal from said approximation mechanism, wherein said subtractor subtracts said approximated error from said non-linear signal to produce said subtracted result.

7. The method of claim 6 wherein said flow transducer comprises a mass airflow transducer.

8. The method of claim 6 wherein said flow transducer comprises a liquid flow transducer.

9. A system for providing a linear signal from a flow transducer, comprising:

a data-processing apparatus;

a module executed by said data-processing apparatus, said module and said data-processing apparatus being operable in combination with one another to:

obtain a non-linear raw signal from a flow transducer;

approximate a non-linear error from said non-linear raw signal;

subtract from said non-linear raw signal, an approximated error comprising discrete sine functions incremented by a variable and selectable value, in order to provide a subtracted result and reduce an error range thereof;

obtain a linear signal from said subtracted result in order to linearize a raw output from said flow transducer; and permit a user to tune a frequency increment associated with said variable and selectable value in order to reduce said error range thereof, wherein said data-processing apparatus comprises an Application Specific Integrated Circuit (ASIC) that is associated with a flow transducer, said ASIC comprising:

an amplifier and a memory for storing a plurality of memory storing coefficients;

an approximation mechanism for performing an approximation calculation, wherein said approximation receives said plurality of memory storing coefficients from said memory and an output signal from said amplifier and wherein said approximation mechanism approximates said non-linear error from said non-linear raw signal;

a circuit for generating said discrete sine function, wherein said circuit provides said discrete sine function to said approximation mechanism; and a subtractor that receives an output signal from said amplifier and an output signal from said approximation mechanism, wherein said subtractor subtracts said approximated error from said non-linear signal to produce said subtracted result.

10. The system of claim 9 wherein said variable and selectable value comprises an omega variable.

11. The system of claim 9 wherein said data-processing apparatus and said module are further operable in combination with one another to permit a user to tune a frequency increment associated with said variable and selectable value in order to reduce said error range thereof.

12. The system of claim 9 wherein said flow transducer comprises a mass airflow transducer.

13. The system of claim 9 wherein said flow transducer comprises a liquid flow transducer.

* * * * *